(12) United States Patent
Satou

(10) Patent No.: US 8,160,633 B2
(45) Date of Patent: Apr. 17, 2012

(54) TRANSMITTED POWER CONTROL METHOD AND MOBILE TERMINAL DEVICE

(75) Inventor: Kazunori Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 437 days.

(21) Appl. No.: 12/447,276

(22) PCT Filed: Oct. 24, 2007

(86) PCT No.: PCT/JP2007/071160
§ 371 (c)(1),
(2), (4) Date: Apr. 27, 2009

(87) PCT Pub. No.: WO2008/050893
PCT Pub. Date: May 2, 2008

(65) Prior Publication Data
US 2009/0318179 A1    Dec. 24, 2009

(30) Foreign Application Priority Data
Oct. 27, 2006   (JP) ................. 2006-293125

(51) Int. Cl.
*H04B 7/00*   (2006.01)

(52) U.S. Cl. ........................................ 455/522; 455/528
(58) Field of Classification Search ........... 455/520–528
See application file for complete search history.

(56) References Cited

U.S. PATENT DOCUMENTS
2004/0180686 A1*   9/2004   Nakayama ................. 455/522
* cited by examiner

*Primary Examiner* — Lam T Mai

(57) ABSTRACT

A control section 100 measures a DPCH_RSCP and a DPCH-ISCP of every path, and calculates a DPCH_RSCP and a DPCH-ISCP for every wireless link. The control section 100 then calculates a DPCH_SIR for every wireless link, and calculates a difference in the DPCH_SIR between wireless links. In the case where the calculated difference in the DPCH_SIR is smaller than a preset threshold value of the DPCH_SIR difference, received TPC data are discarded, and the control section 100 does not execute transmitted power control based on the TPC data. On the other hand, in the case where the calculated difference in the DPCH_SIR is larger than the preset threshold value of the difference in the DPCH_SIR, the control section 100 carries out the transmitted power control based on the TPC data with the wireless link whose DPCH_SIR is larger.

14 Claims, 9 Drawing Sheets

TRANSMITTED POWER CONTROL METHOD AND MOBILE TERMINAL DEVICE

The present application is the National Phase of PCT/JP2007/071160, filed Oct. 24, 2007, which is based upon Japanese patent application No. 2006-293125, filed Oct. 27, 2006, the disclosure of which is incorporated in the present application in its entirety by reference.

TECHNICAL FIELD

The present invention relates to a transmitted power control method and a mobile terminal device in a CDMA-system wireless communication system.

BACKGROUND ART

In recent years, there is a CDMA (Code Division Multiple Access) system as one of communication systems used for wireless communication of a cellular phone, which is developing rapidly, and the like. Further, there is also a W-CDMA (Wideband Code Division Multiple Access) system that can further improve use efficiency of frequencies (hereinafter, in this specification, in the case of stating a CDMA system, the W-CDMA system is included).

In the CDMA system, different digital codes are assigned to cellular phones of transmitters, respectively. Then, an audio signal of one transmitter and an audio signal of another transmitter are integrated to transmit it as one audio signal. In the CDMA system, since a signal integrated so as to share a code between a cellular phone and a base station is decomposed again, simplification of a communication system is possible.

However, in the CDMA system in which all users use a carrier wave of the same frequency, a problem that, in the case where each cellular phone outputs a radio wave with the same transmitted power regardless of a distance from a base station, a radio wave from a nearer cellular phone has too high intensity and a base station cannot thereby separate a signal from a farther cellular phone. Therefore, there is a need that each cellular phone carries out transmitted power control for keeping transmitted power to a minimum. The transmitted power control is effective to keep interference electric energy low, and moreover, can bring about increase in subscriber capacity of the system. Cellular phones generally have a function such as TPC (Transmit Power Control) to hold electric power consumption to a minimum necessary level.

A wireless communication system in which a mobile device such as a cellular phone carries out transmitted power control, thereby achieving more stable handover is disclosed in Japanese Patent Application Publication No. 2005-184708 (Paragraph 0037, FIG. 7). Hereinafter, Japanese Patent Application Publication No. 2005-184708 is stated as Patent Document 1. In the wireless communication system described in Patent Document 1, when to carry out integration between sectors, control of a TPC bit and transmitted power control are carried out in every wireless link (Radio Link; hereinafter, abbreviated to an "RL"). As a result, it is possible to achieve the wireless communication system in which communication quality is improved.

DISCLOSURE OF THE INVENTION

Problems to be Solved by the Invention

However, in the conventional transmitted power control method, even in the case where a plurality of RLs exist, transmitted power control by the TPC is carried out on the basis of data after integration. Then, there is a problem that a mistake in the transmitted power control is made. The mobile device in the wireless communication system described in Patent Document 1 carries out preferential weighting to a high-quality RL and controls transmitted power when to integrate sectors and take out a TPC bit. However, there is a probability to make a mistake in the transmitted power control in the case where an environment of every RL differs from each other largely, a difference in communication quality between uplink and downlink is large, or the like.

It is therefore an object of the present invention to provide a transmitted power control method and a mobile terminal device capable of normally carrying out transmitted power control even in the case where an environment of every RL differs from each other largely, a difference in communication quality between uplink and downlink is large, or the like.

Means for Solving the Problems

A transmitted power control method according to the present invention is a transmitted power control method of carrying out transmitted power control in accordance with a transmitted power control signal, the transmitted power control method being applied to a device that carries out communication with a wireless link in a wireless communication system of a CDMA system, the transmitted power control signal indicating increase or decrease of transmitted power received from a device of a communication companion, the transmitted power control method including: a data acquiring step for acquiring data for every wireless link or every path, the data indicating communication quality of a signal from the device of the communication companion; and a comparing step of comparing information on the data acquired in the data acquiring step with a reference value for determining whether to carry out transmitted power control based on the transmitted power control signal or not, wherein, in the case where a value indicated by the information is less than the reference value, the transmitted power control based on the transmitted power control signal received with the wireless link or path with which the data are acquired is not carried out.

EFFECTS OF THE INVENTION

According to the present invention, it is possible to carry out transmitted power control normally even in the case where an environment of every RL differs from each other largely, a difference in communication quality between uplink and downlink is large, or the like.

BEST MODE FOR CARRYING OUT THE INVENTION (First Embodiment)

Figure 1:
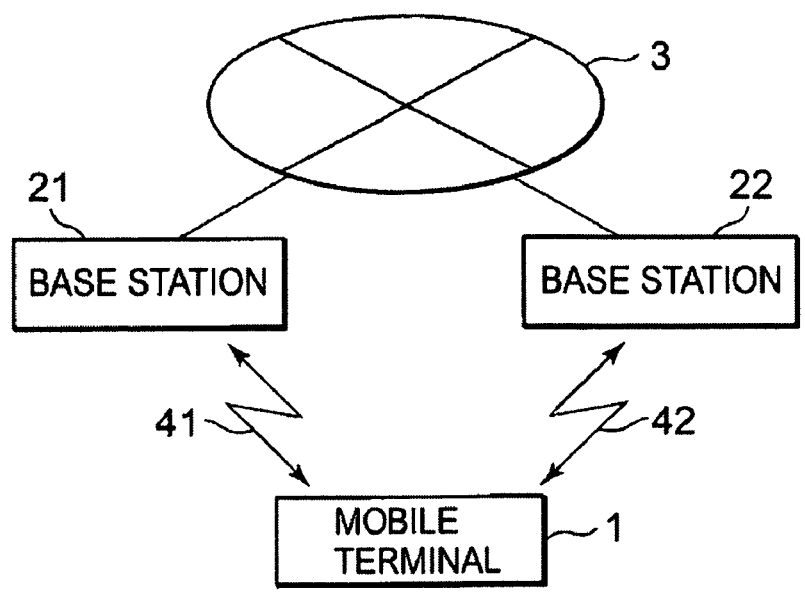
FIG. 1 is a system configuration diagram showing one configuration example of a wireless communication system to which a mobile terminal according to the present invention is applied.

Hereinafter, embodiments of the present invention will be described with reference to the drawings. FIG. 1 is a system configuration diagram showing one configuration example of a wireless communication system including a mobile terminal device according to the present invention (hereinafter, referred to as a "mobile terminal"). The wireless communication system includes: a mobile terminal 1 such as a cellular phone; base stations 21, 22 capable of wireless communication with the mobile terminal 1; and a cellular phone network 3 connected to the base stations 21, 22. The mobile terminal 1 can be connected to the cellular phone network 3 via the base stations 21, 22. Hereinafter, the case where a cellular phone is applied to the wireless communication system will be described as an example. In this regard, although one mobile terminal 1 is shown in FIG. 1, the wireless communication system may include a plurality of mobile terminals 1. Further, although the case where there are two base stations is shown in FIG. 1, the wireless communication system may include a plurality of base stations. Hereinafter, a transmitted power control method of determining validity or invalidity of TPC data using a power ratio between a desired signal and an interference signal (hereinafter, referred to as "DPCH_SIR") as communication quality for every RL will be described. Determining validity or invalidity of TPC data means determining whether the TCP data are to be used or not.

Figure 2:
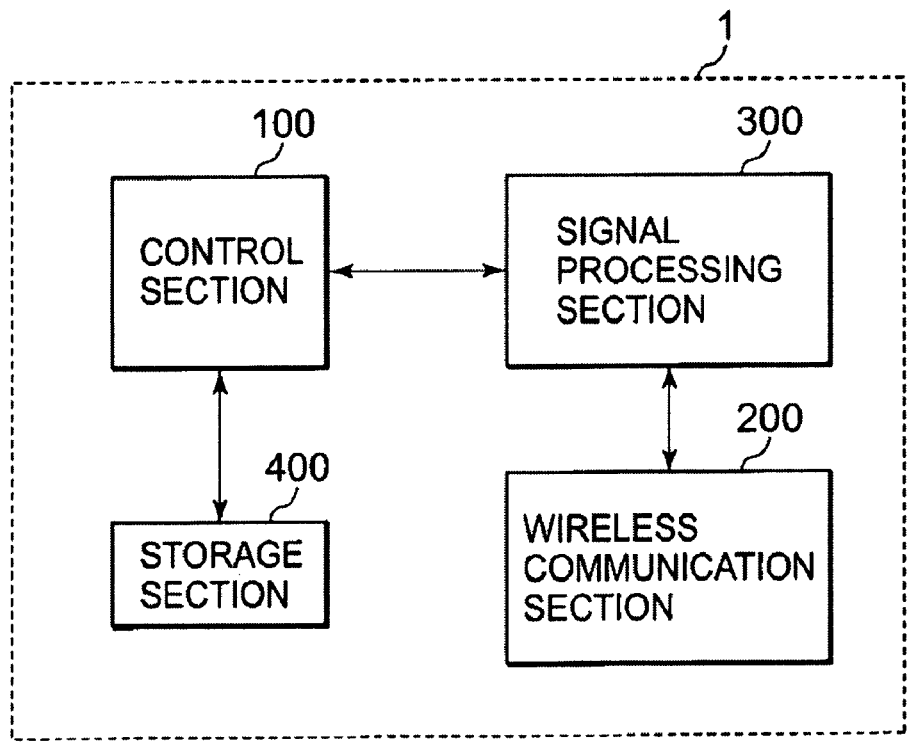
FIG. 2 is a block diagram showing one configuration example of a mobile terminal 1.

FIG. 2 is a block diagram showing one configuration example of the mobile terminal 1. The mobile terminal 1 is provided with: a control section 100 for controlling operation of the mobile terminal 1; a wireless communication section 200 for carrying out transmission and reception of radio waves; a signal processing section 300 for carrying out digital conversion of a received signal and the like; and a storage section 400. In this regard, the mobile terminal 1 is also provided with other functional sections (for example, a key operation section and display section).

The control section 100 controls overall applications of the mobile terminal 1. The control section 100 is implemented by a CPU and various peripheral circuits (not shown in the drawings), for example. The control section 100 includes a non-transitory computer-readable medium storing a computer program executed by the CPU to control transmitted power in accordance with a process (specifically, a process for determining whether the TPC data are to be used or not) (will be described later).

The wireless communication section 200 has a function to carry out modulation and demodulation of a signal. Namely, the wireless communication section 200 executes a process to carry out a modulation process for transmitted data. Further, the wireless communication section 200 has a function to demodulate a high-frequency signal on the basis of a received radio wave to send it to the signal processing section 300. In this regard, the wireless communication section 200 includes a transmitted power amplifier. The transmitted power amplifier amplifies or attenuates the transmitted power in accordance with a control signal by the control section 100.

The signal processing section 300 has a function to carry out a process to digitize and compress an audio. Specifically, the signal processing section 300 carries out digitization or time compression and expansion of the audio. The signal processing section 300 encodes and time-compresses the audio to output it to the wireless communication section 200, for example.

The storage section 400 manages configuration information of the mobile terminal 1 and the like. Various data such as a control program executed by the control section 100 and a threshold value of a difference in a DPCH_SIR (will be described later) are stored in the storage section 400, for example.

Figure 3:
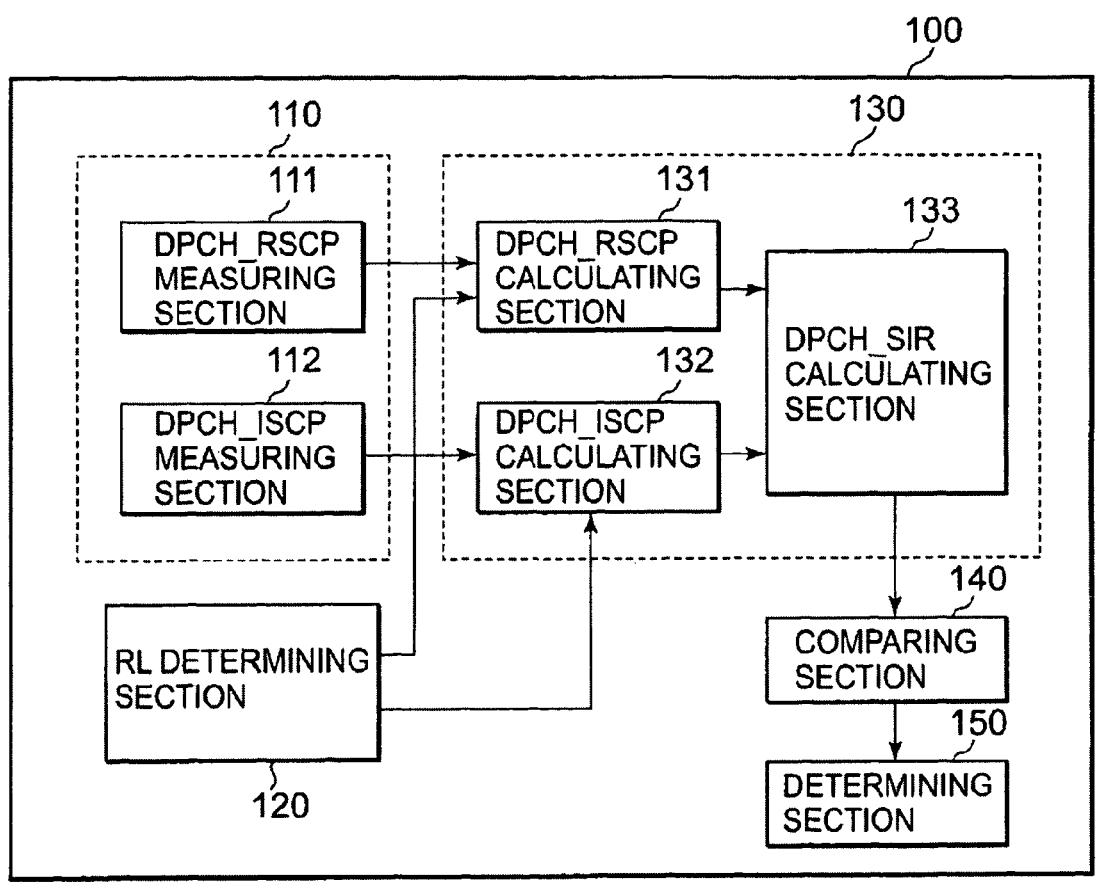
FIG. 3 is a block diagram showing one configuration example of a control section 100 according to a first embodiment.

FIG. 3 is a block diagram showing one configuration example of the control section 100. The control section 100 includes: a measuring section 110 for measuring a desired wave reception level (hereinafter, referred to as a "DPCH_R-SCP") and an interference wave reception level (hereinafter, referred to as a "DPCH-ISCP") for every path; an RL determining section 120; a calculating section 130 for calculating a DPCH_RSCP, a DPCH-ISCP and a DPCH_SIR of every RL; a comparing section 140 for comparing the DPCH_SIR of every RL; and a determining section 150 for determining whether TPC data are to be used or not.

The measuring section 110 specifically includes a DPCH_RSCP measuring section 111 and a DPCH-ISCP measuring section 112. The DPCH_RSCP measuring section 111 measures a DPCH_RSCP for every path, and the DPCH-ISCP measuring section 112 measures a DPCH-ISCP for every path. The measuring section 110 outputs a result measured by each of the measuring sections to the calculating section 130.

The RL determining section 120 has a function to determine which RL each path belongs to, and to output a determination result to the calculating section 130. Specifically, the RL determining section 120 determines which RL each path belongs to on the basis of code information of every path. Namely, it determines that a path belongs to an RL corresponding to the most similar code information to code information of the path.

The calculating section 130 includes a DPCH_RSCP calculating section 131, a DPCH-ISCP calculating section 132 and a DPCH_SIR calculating section 133. Each of the calculating sections carries out calculation for each RL using information inputted from the measuring section 110 and the RL determining section 120. Each of the DPCH_RSCP calculating section 131 and the DPCH-ISCP calculating section 132 outputs a calculated calculation result to the DPCH_SIR calculating section 133. The DPCH_SIR calculating section 133 then calculate a DPCH_SIR for every RL on the basis of the inputted calculation results. The DPCH_SIR calculating section 133 outputs a calculation result to the comparing section 140.

The comparing section 140 has a function to compare a DPCH_SIR of every RL on the basis of the calculation result inputted from the DPCH_SIR calculating section 133. The comparing section 140 compares the DPCH_SIRs of the RL 41 and RL 42 shown in FIG. 1, for example, and calculates the difference.

Further, the comparing section 140 has a function to read out a preset threshold value of the difference in the DPCH_SIR from the storage section 400, and to compare the calculated difference in the DPCH_SIR. The comparing section 140 outputs the comparison result to the determining section 150.

The determining section 150 has a function to determine whether to carry out transmitted power control or not on the basis of the TPC data received with the RL 41 and the RL 42. The determining section 150 specifically carries out determination of whether to use the TPC data or not on the basis of the comparison result inputted by the comparing section 140. In the case where it is determined that the determining section 150 uses the TPC data, the control section 100 controls the transmitted power amplifier in the wireless communication section 200 so that an output level becomes a level specified by a TPC bit.

Figure 4:
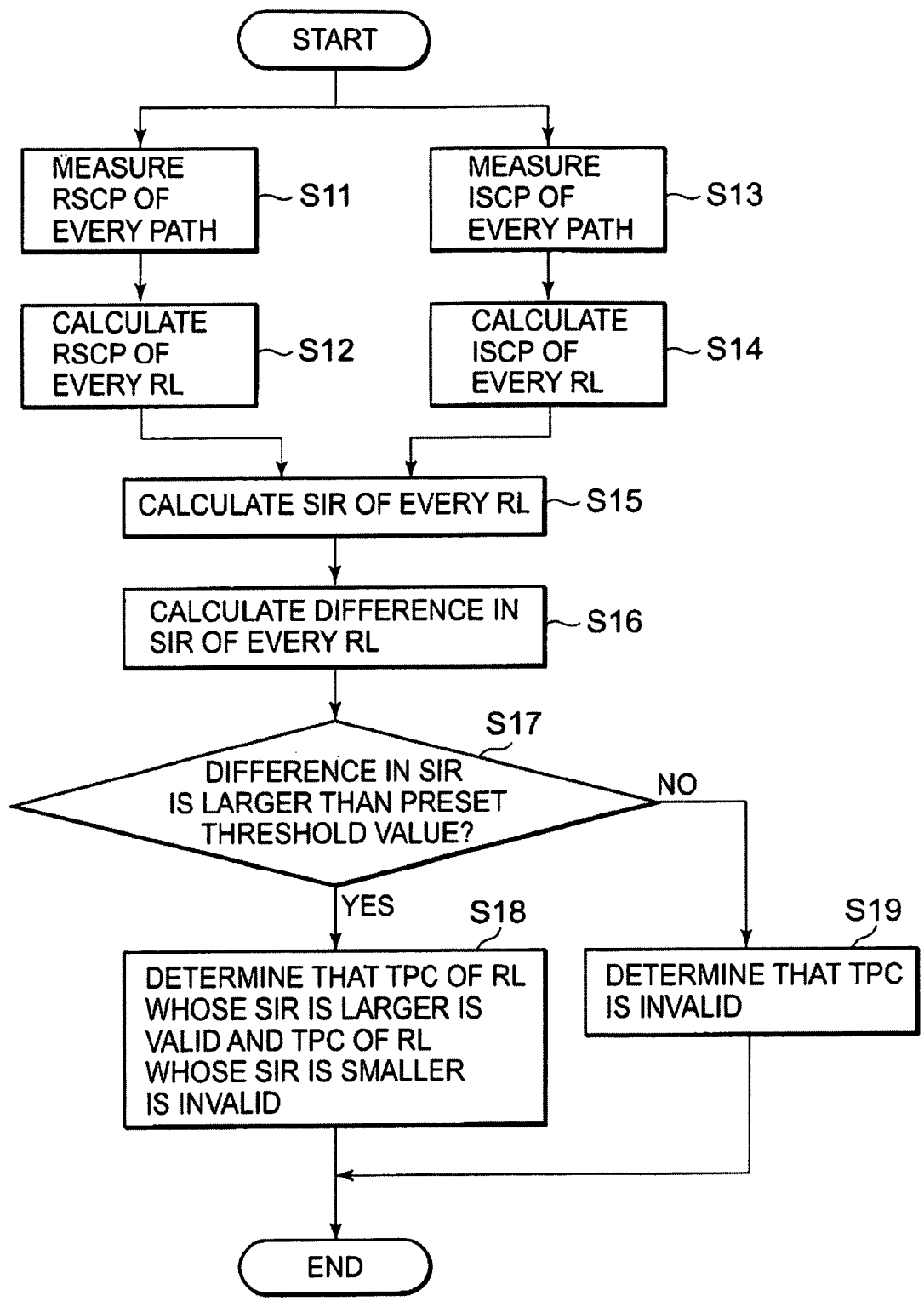
FIG. 4 is a flowchart showing operation of the mobile terminal 1.

Next, operation of the mobile terminal 1 will be described. FIG. 4 is a flowchart showing operation of the mobile terminal 1 in the wireless communication system. When the TPC data are received with the RL 41 and the RL 42, the mobile terminal 1 determines whether to carry out transmitted power control based on the TPC data or not.

The DPCH_RSCP measuring section 111 first measures a DPCH_RSCP of every path on the basis of the signal received by the wireless communication section 200 (Step S11), and outputs a measurement result to the DPCH_RSCP calculating section 131. The DPCH_RSCP calculating section 131 calculates a DPCH_RSCP of every RL on the basis of the measurement result inputted by the DPCH_RSCP measuring section 111 and the determination result inputted by the RL determining section 120 (Step S12). Specifically, the DPCH_RSCP calculating section 131 calculates the DPCH_RSCP of every RL from an electric power level at a peak position of the received signal of every RL.

Further, the DPCH-ISCP measuring section 112 measures a DPCH-ISCP of every path on the basis of the signal received by the wireless communication section 200 (Step S13), and outputs a measurement result to the DPCH-ISCP calculating section 132. The DPCH-ISCP calculating section 132 calculates the DPCH-ISCP of every RL on the basis of the measurement result inputted by the DPCH-ISCP measuring section 112 and the determination result inputted by the RL determining section 120 (Step S14). For example, the DPCH-ISCP calculating section 132 calculates dispersion to the DPCH_RSCP of every RL calculated by the DPCH_RSCP calculating section 131 to be set to the DPCH-ISCP of every RL.

In this regard, it is preferable that the processes at Steps S11 and S12 and the processes at Steps S13 and S14 are carried out in parallel. The DPCH_RSCP calculating section 131 and the DPCH-ISCP calculating section 132 respectively outputs the calculated calculation results to the DPCH_SIR calculating section 133.

The DPCH_SIR calculating section 133 calculates a DPCH_SIR of every RL from the DPCH_RSCP of every RL and the DPCH-ISCP of every RL (Step S15). The DPCH_SIR calculating section 133 calculates the DPCH_SIR of each of the RL 41 and the RL 42 in the wireless communication system shown in FIG. 1, for example. The DPCH_SIR calculating section 133 outputs a calculation result to the comparing section 140.

The comparing section 140 calculates a difference in the DPCH_SIR between the RLs from the DPCH_SIR of each RL (Step S16). The difference corresponds to information on data indicating communication quality. The comparing section 140 reads out a preset threshold value of the difference in the DPCH_SIR from the storage section 400. The comparing section 140 then determines whether the calculated difference in the DPCH_SIR is larger than the preset threshold value of the difference in the DPCH_SIR or not (Step S17).

In the case where the difference in the DPCH_SIR calculated by the comparing section 140 is smaller than the preset threshold value of the difference in the DPCH_SIR (Step S17; NO), the determining section 150 discards the TPC data received with the RL (Step S19). In that case, the control section 100 does not execute the transmitted power control based on the TPC data. Namely, the control section 100 does not output a control signal regarding the transmitted power control to the transmitted power amplifier. Therefore, the transmitted power amplifier does not carry out a process to change the transmitted power on the basis of the TPC data.

In the case where the difference in the DPCH_SIR calculated by the comparing section 140 is larger than the preset threshold value of the difference in the DPCH_SIR (Step S17; YES), the determining section 150 determines to use the TPC data of the RL in which the DPCH_SIR is larger (Step S18). In that case, the control section 100 executes the transmitted power control based on the TPC data.

The determining section 150 discards the TPC data of the RL in which the DPCH_SIR is smaller (Step S18). In that case, the control section 100 does not execute the transmitted power control based on the TPC data.

As described above, the mobile terminal 1 of the present embodiment determines whether the received TPC data are to be used for each of the RL 41 and the RL 42 or not. Therefore, since transmitted power control by the TPC based on data after integration of sectors is not carried out unlike the conventional transmitted power control method, it is possible to reduce possibility to carry out wrong transmitted power control. In particular, even in the case where an environment of every RL differs from each other largely or a difference in communication quality between uplink and downlink is large, it is possible to achieve normal transmitted power control.

In this regard, in the present process method for actual evaluation data, an error rate of about 30% exists. However, according to the present invention, for example, in transmitted power control at switching of base stations, even in the case where it is under an environment that there is a large difference in communication quality between a switching base station and a switched base station, and transmitted power control cannot thereby be carried out normally in the conventional process method, it is possible to reduce the error rate to less than 30%.

(Second Embodiment)

Next, a second embodiment according to the present invention will be described with reference to the drawings. The control section 100 according to the first embodiment determined whether to use the TPC data or not using the DPCH_SIR of every RL and executed the transmitted power control. On the other hand, a control section 100 of the present embodiment determines whether to use TCP data or not using a DPCH_RSCP for every RL, and controls transmitted power.

Figure 5:
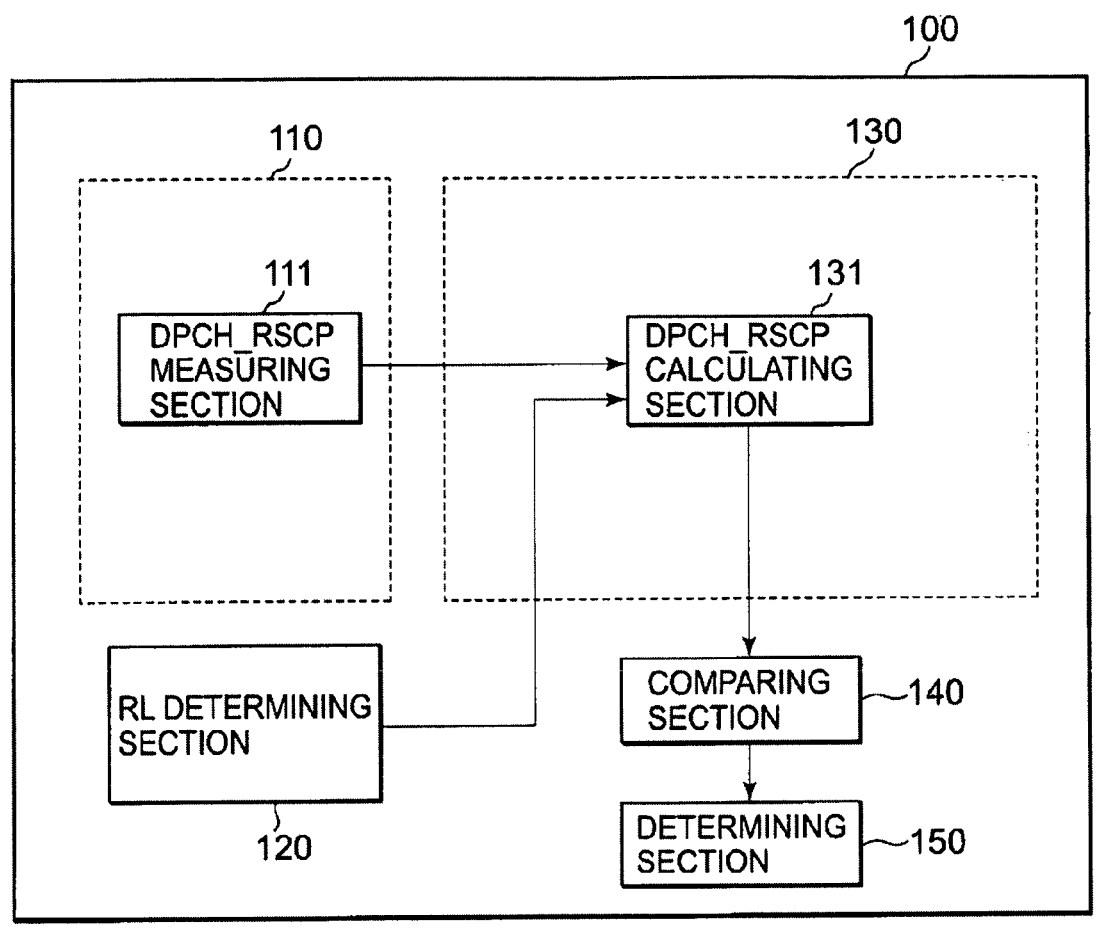
FIG. 5 is a block diagram showing one configuration example of a control section 100 according to a second embodiment.

FIG. 5 is a block diagram showing one configuration example of the control section 100 according to the present embodiment. As shown in FIG. 5, the control section 100 of the present embodiment includes: a DPCH_RSCP measuring section 111; a RL determining section 120; a DPCH_RSCP calculating section 131; a comparing section 14; and a determining section 150. Each of the functional sections carries out the similar process to that of the functional section shown in FIG. 3. In this regard, in the present embodiment, the comparing section 140 carries out a process to compare a DPCH_RSCP of every RL. Further, the comparing section 140 compares a difference in the DPCH_RSCP of every RL with a preset threshold value of the difference in the DPCH_RSCP.

Figure 6:
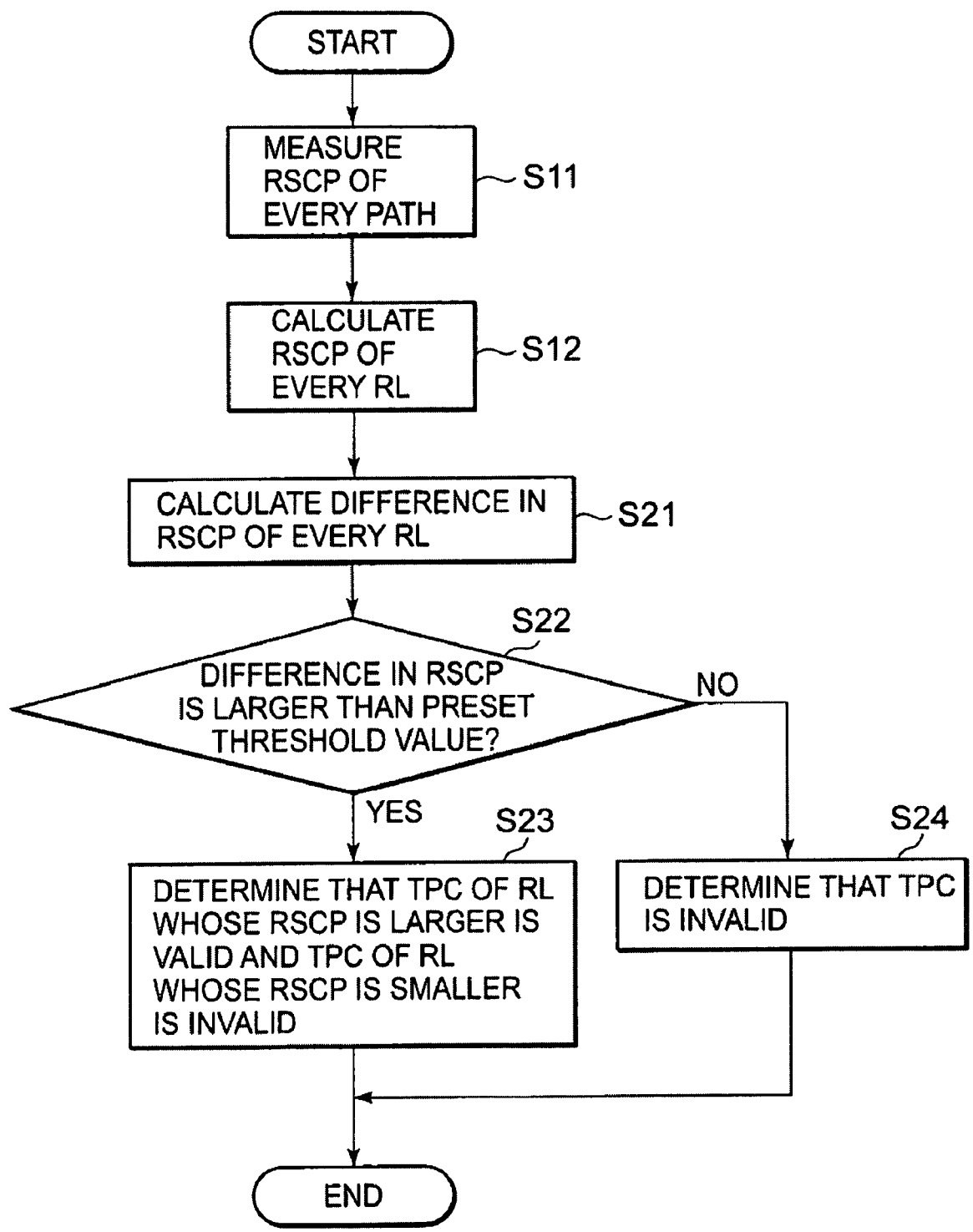
FIG. 6 is a flowchart showing operation of a mobile terminal 1 according to the second embodiment.

Next, operation of the mobile terminal 1 will be described. FIG. 6 is a flowchart showing operation of the mobile terminal 1 according to the second embodiment. In this regard, in FIG. 6, the same reference numerals as the reference numerals in FIG. 3 are assigned for the same operations as the operations of the mobile terminal 1 in the first embodiment shown in FIG. 3.

The DPCH_RSCP measuring section 111 first measures a DPCH_RSCP of every path on the basis of a signal received by the wireless communication section 200 (Step S11), and outputs a measurement result to the DPCH_RSCP calculating section 131. The DPCH_RSCP calculating section 131 calculates a DPCH_RSCP of every RL on the basis of the measurement result inputted by the DPCH_RSCP measuring section 111 and a determination result inputted by the RL determining section 120 (Step S12). Specifically, the DPCH_RSCP calculating section 131 calculates the DPCH_RSCP of every RL from an electric power level in a peak position of the received signal of every RL. The DPCH_RSCP calculating section 131 then outputs a calculation result to the comparing section 140.

The comparing section 140 compares the DPCH_RSCP of each RL. Specifically, the comparing section 140 calculates a difference in the DPCH_RSCP between the RLs from the DPCH_RSCP of each RL (Step S21). When the comparing section 140 calculates the difference in the DPCH_RSCP, the comparing section 140 reads out a preset threshold value of the difference in the DPCH_RSCP from the storage section 400. The comparing section 140 then determines whether the calculated difference in the DPCH_RSCP is larger than the preset threshold value of the difference in the DPCH_RSCP or not (Step S22).

In the case where the difference in the DPCH_RSCP calculated by the comparing section 140 is smaller than the preset threshold value of the difference in the DPCH_RSCP (Step S22; NO), the determining section 150 discards the TPC data received with the RL (Step S24). In that case, the control section 100 does not execute the transmitted power control based on the TPC data.

In the case where the difference in the DPCH_RSCP calculated by the comparing section 140 is larger than the preset threshold value of the difference in the DPCH_RSCP (Step S22; YES), the determining section 150 compares DPCH_RSCPs of the respective RLs. The determining section 150 then uses the TPC data of the RL whose DPCH_RSCP is larger (Step S23). In that case, the control section 100 executes the transmitted power control based on the TPC data.

On the other hand, the determining section 150 discards the TPC data of the RL whose DPCH_RSCP is smaller (Step S23). In that case, the control section 100 does not execute the transmitted power control based on the TPC data.

As described above, the mobile terminal 1 of the present embodiment determines whether the received TPC data are to be used for each of the RL 41 and the RL 42 or not. Therefore, since transmitted power control by the TPC based on data after integration of sectors is not carried out unlike the conventional transmitted power control method, it is possible to reduce possibility to carry out wrong transmitted power control. In particular, even in the case where an environment of every RL differs from each other largely or a difference in communication quality between uplink and downlink is large, it is possible to achieve normal transmitted power control.

In this regard, in the present process method for actual evaluation data, an error rate of about 30% exists. However, according to the present invention, for example, in transmitted power control at switching of base stations, even in the case where it is under an environment that there is a large difference in communication quality between a switching base station and a switched base station, and transmitted power control cannot thereby be carried out normally in the conventional process method, it is possible to reduce the error rate to less than 30%.

(Third Embodiment)

Next, a third embodiment according to the present invention will be described with reference to the drawings. The control section 100 in the first embodiment determined whether to use the TPC data or not using the DPCH_SIR of every RL, and executed the transmitted power control. A control section 100 of the present embodiment determines whether to use TCP data or not using a DPCH_SIR of every path, and controls transmitted power.

Figure 7:
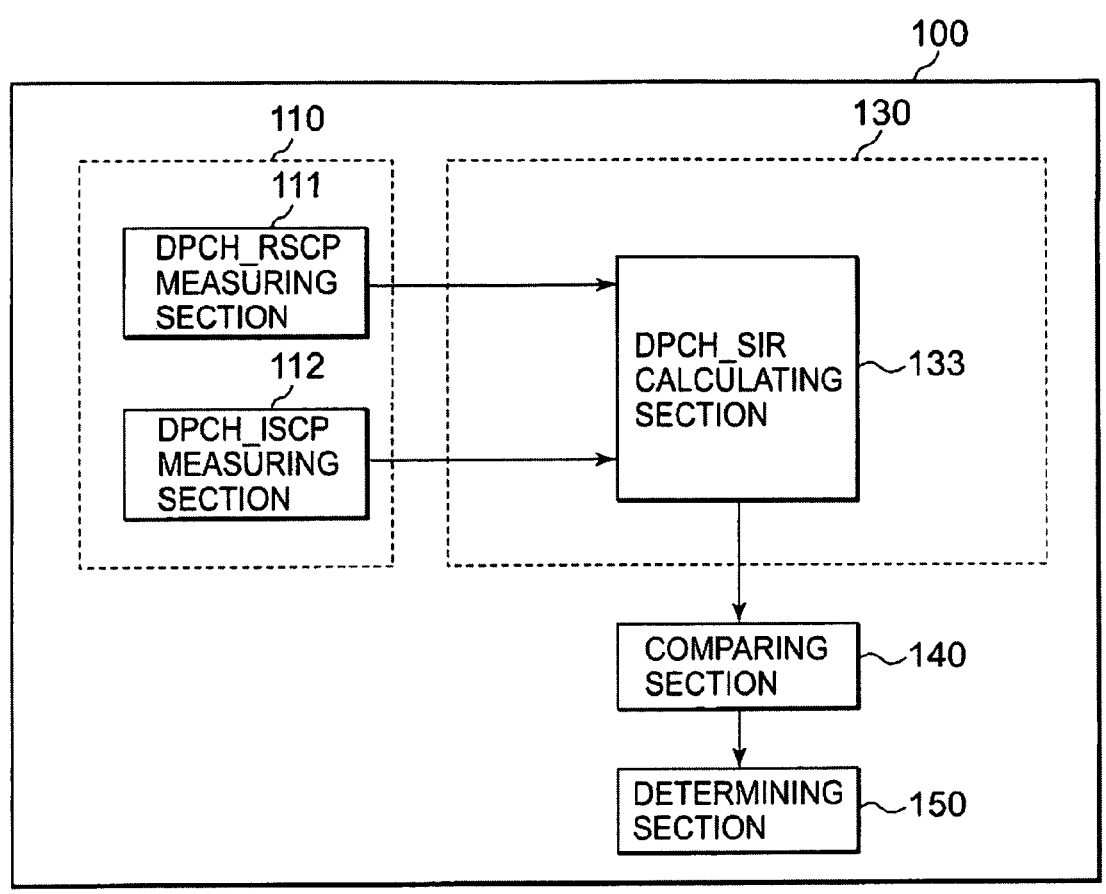
FIG. 7 is a block diagram showing one configuration example of a control section 100 according to a third embodiment.

FIG. 7 is a block diagram showing one configuration example of the control section 100 according to the present embodiment. As shown in FIG. 7, the control section 100 of the present embodiment includes: a DPCH_RSCP measuring section 111; a DPCH-ISCP measuring section 112; a DPCH_SIR calculating section 133; a comparing section 140; and a determining section 150. Each of the functional sections carries out the similar process to that of the functional section shown in FIG. 3. In this regard, in the present embodiment, the DPCH SIR calculating section 133 calculates a DPCH_SIR of every path. Further, the comparing section 140 carries out a process to compare a DPCH_SIR of every path. Moreover, the comparing section 140 compares a difference in the DPCH_SIR of every path with a preset threshold value of the difference in the DPCH_SIR.

Figure 8:
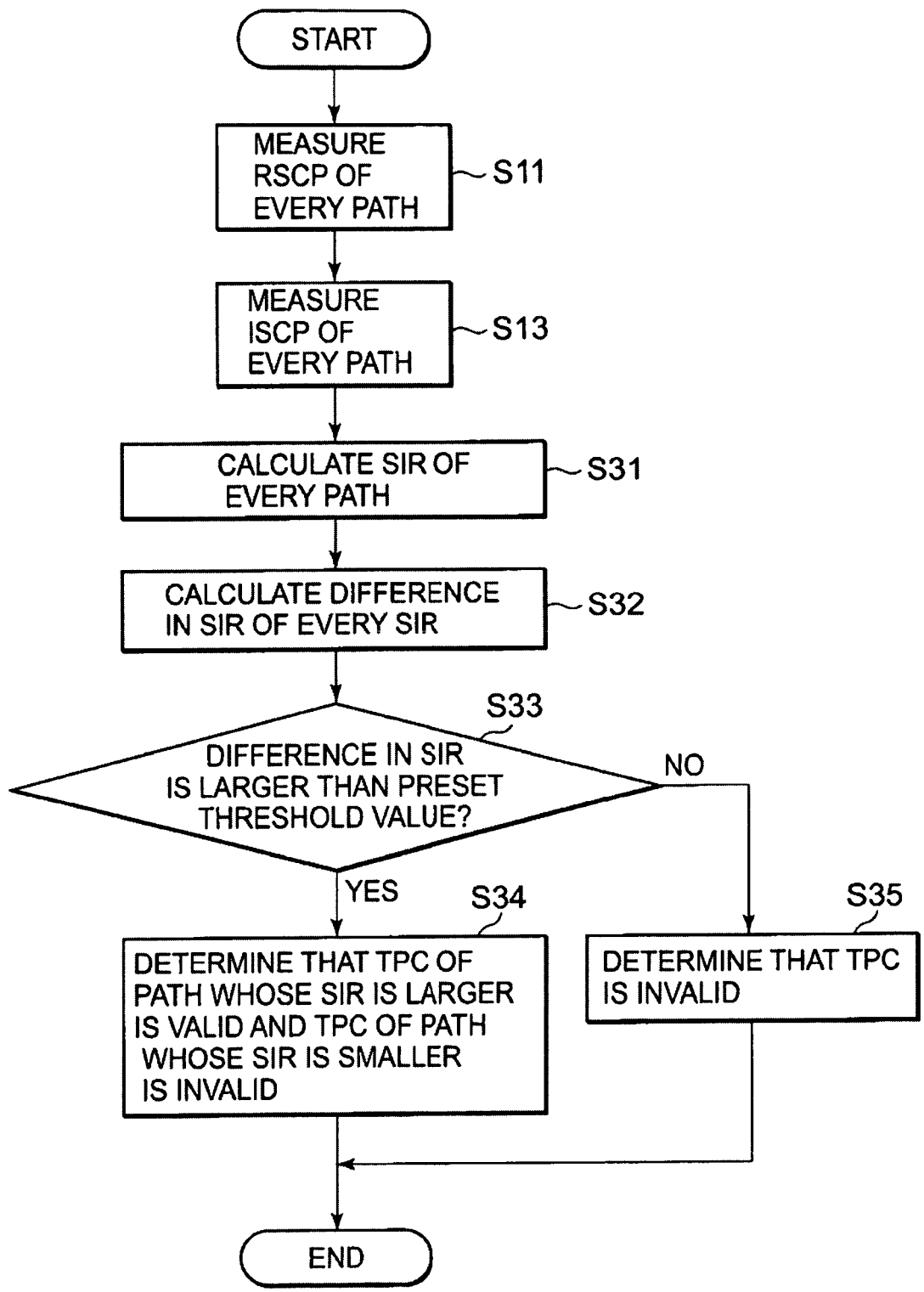
FIG. 8 is a flowchart showing operation of a mobile terminal 1 according to the third embodiment.

Next, operation of the mobile terminal 1 will be described. FIG. 8 is a flowchart showing operation of the mobile terminal 1 according to the present embodiment. In this regard, in FIG. 8, the same reference numerals as the reference numerals in FIG. 3 are assigned for the same operations as the operations of the mobile terminal 1 in the first embodiment shown in FIG. 3.

The DPCH_RSCP measuring section 111 first measures a DPCH_RSCP of every path on the basis of a signal received by the wireless communication section 200 (Step S11). Further, the DPCH-ISCP measuring section 112 measures a DPCH-ISCP of every path (Step S13). The DPCH_RSCP measuring section 111 and the DPCH-ISCP measuring section 112 respectively output measurement results to the DPCH_SIR calculating section 133.

The DPCH_SIR calculating section 133 calculates a DPCH_SIR of every path from the DPCH_RSCP of every path and the DPCH-ISCP of every path (Step S31). The DPCH_SIR calculating section 133 outputs a calculation result to the comparing section 140.

The comparing section 140 compares the DPCH_SIR of each path. Specifically, the comparing section 140 calculates a difference in the DPCH_SIR between paths from the DPCH_SIR of each path (Step S32).

When the comparing section 140 calculates the difference in the DPCH_SIRs, the comparing section 140 reads out a preset threshold value of the difference in the DPCH_SIRs from the storage section 400. The comparing section 140 then determines whether the calculated difference in the DPCH_SIRs is larger than the preset threshold value of the difference in the DPCH_SIRs or not (Step S33).

In the case where the difference in the DPCH_SIR of every path calculated by the comparing section 140 is smaller than the preset threshold value of the difference in the DPCH_SIRs (Step S33; NO), the determining section 150 discards the TPC data received with the path (Step S35). In that case, the control section 100 does not execute the transmitted power control based on the TPC data.

In the case where the difference in the DPCH_SIR of every path calculated by the comparing section 140 is larger than the preset threshold value of the difference in the DPCH_SIRs (Step S33; YES), the determining section 150 compares the DPCH_SIR of each path. The determining section 150 then uses the TPC data of the path in which the DPCH_SIR is larger (Step S34). In that case, the control section 100 executes the transmitted power control.

On the other hand, the determining section 150 discards the TPC data of the path in which the DPCH_SIR is smaller (Step S34). In that case, the control section 100 does not execute the transmitted power control based on the TPC data.

As described above, the mobile terminal 1 of the present embodiment determines for every path whether to use the received TPC data or not. Therefore, even in the case where an environment of every path differs from each other largely or the like, the mobile terminal 1 can achieve normal transmitted power control.

In this regard, the control section 100 of the present embodiment determines whether to use the TCP data or not using the DPCH_SIR of every path, but the control section 100 may determines whether to use the TCP data using the DPCH_RSCP of every path. In that case, the control section 100 is implemented by the DPCH_RSCP measuring section 111, the comparing section 140 and the determining section 150.

(Fourth Embodiment)

Next, a fourth embodiment according to the present invention will be described with reference to the drawings. A control section 100 of the present embodiment determines whether TCP data are to be used or not using pilot synchronization for every path, and controls transmitted power.

Figure 9:
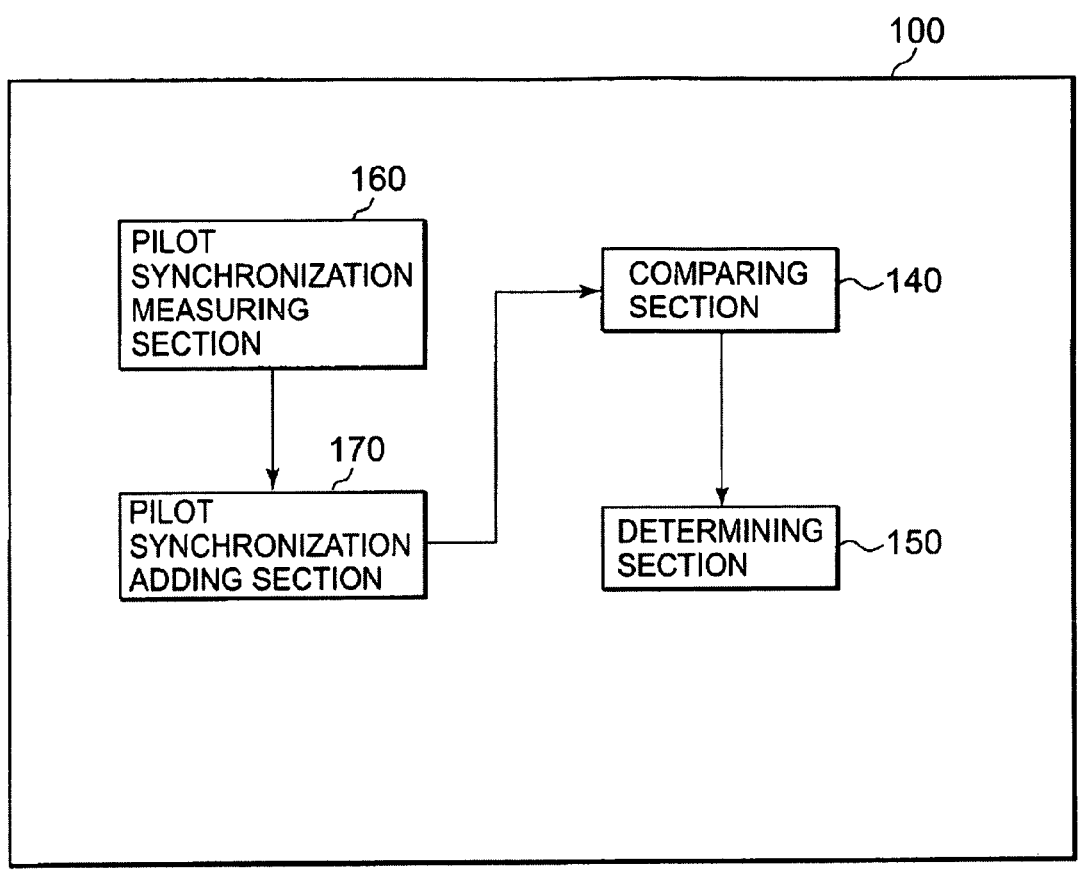
FIG. 9 is a block diagram showing one configuration example of a control section 100 according to a fourth embodiment.

FIG. 9 is a block diagram showing one configuration example of the control section 100 according to the present embodiment. As shown in FIG. 9, the control section 100 of the present embodiment includes: a pilot synchronization measuring section 160 for measuring pilot synchronization of every path; a pilot synchronization adding section 170 for calculating a pilot synchronization count number of every frame; a comparing section 140; and a determining section 150. In this regard, the pilot synchronization count number of every frame corresponds to data indicating communication quality, and is a number obtained by counting pilot signals coinciding with codes from pilot signals of every slot. Further, in the present embodiment, the comparing section 140 compares the pilot synchronization count number of every frame with a preset threshold value of the synchronization count number of every frame.

Figure 10:
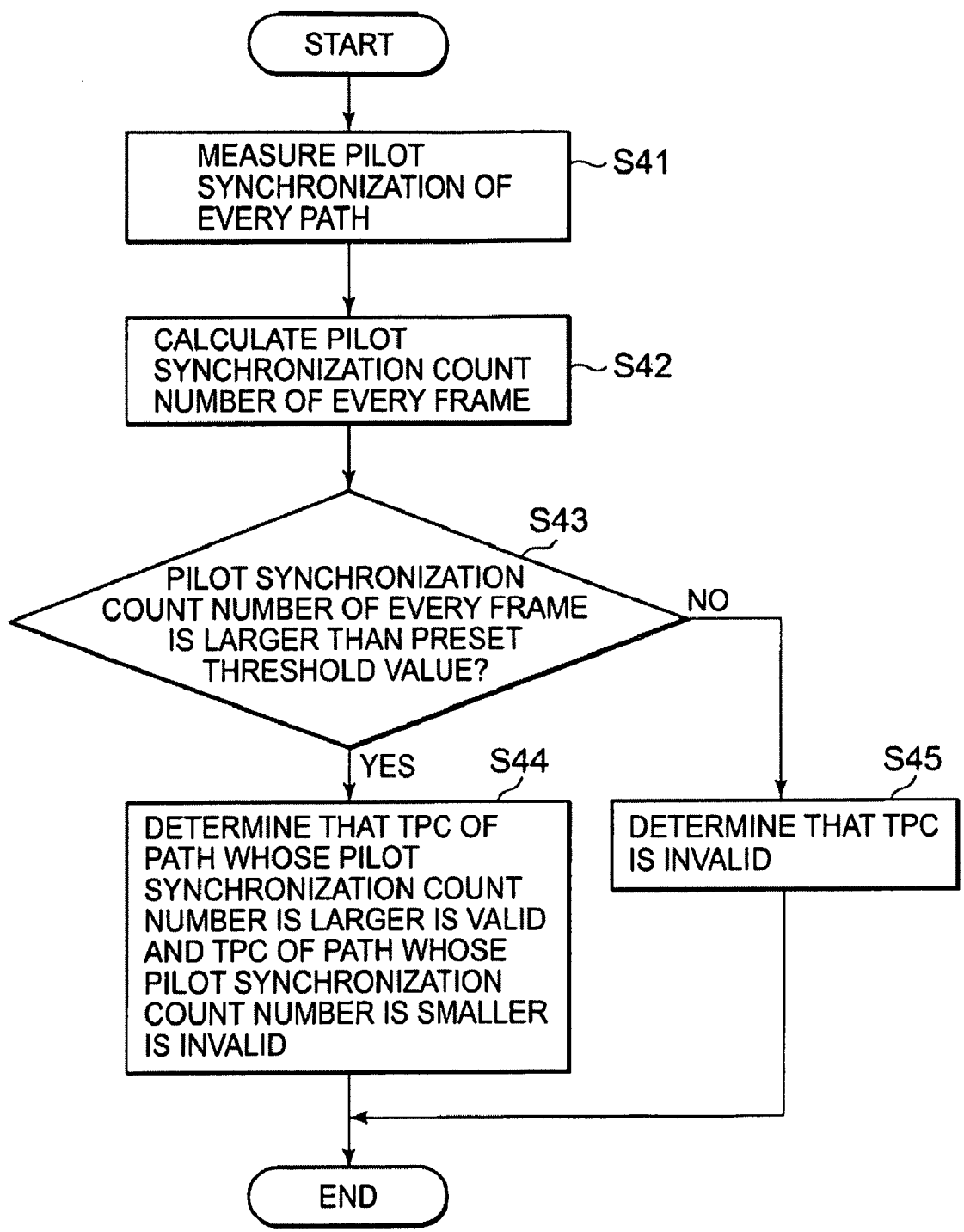
FIG. 10 is a flowchart showing operation of a mobile terminal 1 according to the fourth embodiment.

Next, operation of the mobile terminal 1 will be described. FIG. 10 is a flowchart showing operation of the mobile terminal 1 according to the present embodiment.

The pilot synchronization measuring section 160 first measures pilot synchronization of every path on the basis of a signal received by the wireless communication section 200 (Step S41). The pilot synchronization adding section 170 then calculates a pilot synchronization count number of every frame (Step S42). The pilot synchronization adding section 170 outputs the calculated pilot synchronization count number of every frame to the comparing section 140.

When the pilot synchronization count number of every frame is inputted from the pilot synchronization adding section 170, the comparing section 140 reads out the preset threshold value of the synchronization count number of every frame from the storage section 400. The comparing section 140 then compares the preset threshold value of the synchronization count number of every frame with the measured pilot synchronization count number of every frame. Specifically, the comparing section 140 determines whether the pilot synchronization count number of every frame is larger than the preset threshold value of the synchronization count number of every frame or not (Step S43).

In the case where the pilot synchronization count number of every frame is smaller than the preset threshold value of the synchronization count number of every frame (Step S43; NO), the determining section 150 discards the TPC data received with the path (Step S45). In that case, the control section 100 does not execute the transmitted power control based on the TPC data.

In the case where the pilot synchronization count number of every frame is larger than the preset threshold value of the synchronization count number of every frame (Step S43; YES), the determining section 150 uses the TPC data received with the path (Step S44). In that case, the control section 100 executes the transmitted power control based on the TPC data.

As described above, the mobile terminal 1 of the present embodiment determines for every path whether to use the received TPC data or not. Therefore, even in the case where an environment of every path differs from each other largely or the like, the mobile terminal 1 can achieve normal transmitted power control.

For example, in transmitted power control at switching of base stations, even in the case where it is under an environment that there is a large difference in communication quality between a switching base station and a switched base station, and transmitted power control cannot thereby be carried out normally in the conventional process method, it is possible to reduce the error rate.

In this regard, the transmitted power control method according to the present invention may be achieved by combining two or more methods of the transmitted power control methods by the TPC in the first to fourth embodiments.

(Conclusion)

The transmitted power control method of the present invention may be configured so that in the comparing step, the difference in communication quality indicated by the data acquired from the two wireless links or two paths is used as information on data acquired in the data acquiring step, and transmitted power control based on a transmitted power control signal received with a wireless link or path with which data indicating lower communication quality have been acquired is not carried out in the case where the difference is less than a reference value.

It is configured so that, in the data acquiring step, a DPCH_RSCP of every wireless link is measured to be set to the data indicating the communication quality.

It is configured so that, in the data acquiring step, a DPCH_SIR of every wireless link is measured to be set to the data indicating the communication quality.

It is configured so that, in the data acquiring step, a DPCH_RSCP of every path is measured to be set to the data indicating the communication quality.

It is configured so that, in the data acquiring step, a DPCH_SIR of every path is measured to be set to the data indicating the communication quality.

It is configured so that, in the data acquiring step, pilot synchronization of every path is detected to be the data indicating the communication quality, and a pilot synchronization count number of every frame is data indicating communication quality as the data indicating the communication quality.

The mobile terminal device according to the present invention is a mobile terminal device provided with transmitted power control means, the transmitted power control means carrying out communication with a wireless link in a wireless communication system of a CDMA system, the transmitted power control means carrying out transmitted power control in accordance with a transmitted power control signal, the transmitted power control signal indicating increase or decrease of transmitted power received from a base station, characterized in that the mobile terminal device includes: data acquiring means for acquiring data for every wireless link or every path, the data indicating communication quality of a signal from a device of a communication companion; and comparing means for comparing information on the data acquired by the data acquiring means with a reference value for determining whether to carry out transmitted power control based on the transmitted power control signal or not, wherein the transmitted power control means does not carry out the transmitted power control based on the transmitted power control signal received with the wireless link or path with which the data are acquired in the case where a value indicated by the information is less than the reference value.

The mobile terminal device may be configured so that the comparing means uses a difference in communication quality indicated by the data acquired from the two wireless links or two paths as the information on the data acquired by data acquiring means, and that the transmitted power control means does not carry out the transmitted power control based on the transmitted power control signal received with the wireless link or path with which the data indicating lower communication quality have been acquired in the case where the difference is less than the reference value.

As described above, although the present invention has been described on the basis of the embodiments, the present invention is not limited to these. It is apparent for one skilled in the art to allow modifications within the scope of the technical idea of the present invention.

The invention claimed is:

1. A transmitted power control method of carrying out transmitted power control in accordance with a transmitted power control signal, the transmitted power control method being applied to a first device that carries out communication with a wireless link in a wireless communication system of a CDMA system, the transmitted power control signal indicating increase or decrease of transmitted power received from a second device of a communication companion, the transmitted power control method comprising:
  a data acquiring step that the first device acquires data for every wireless link or every path, the data indicating communication quality of a signal from the second device; and
  a comparing step that the first device compares a difference in communication quality indicated by the data acquired from the two wireless links or two paths with a reference value for determining whether to carry out transmitted power control based on the transmitted power control signal or not,
  wherein, in the case where the difference is less than the reference value, the transmitted power control based on the transmitted power control signal received with the wireless link or path with which the data indicating lower communication quality have been acquired is not carried out with the first device.

2. The transmitted power control method as claimed in claim 1, wherein in the data acquiring step, a DPCH_RSCP of every wireless link is measured to be set to the data indicating the communication quality.

3. The transmitted power control method as claimed in claim 1, wherein in the data acquiring step, a DPCH_SIR of every wireless link is measured to be set to the data indicating the communication quality.

4. The transmitted power control method as claimed in claim 1, wherein in the data acquiring step, a DPCH_RSCP of every path is measured to be set to the data indicating the communication quality.

5. The transmitted power control method as claimed in claim 1, wherein in the data acquiring step, a DPCH_SIR of every path is measured to be set to the data indicating the communication quality.

6. The transmitted power control method as claimed in claim 1, wherein in the data acquiring step, pilot synchronization of every path is detected to set a pilot synchronization count number of every frame to data indicating communication quality as the data indicating the communication quality.

7. A mobile terminal device provided with transmitted power control means, the transmitted power control means carrying out communication with a wireless link in a wireless communication system of a CDMA system, the transmitted power control means carrying out transmitted power control in accordance with a transmitted power control signal, the transmitted power control signal indicating increase or decrease of transmitted power received from a base station, the mobile terminal device comprising:
  data acquiring means for acquiring data for every wireless link or every path, the data indicating communication quality of a signal from a device of a communication companion; and
  comparing means for comparing information on the data acquired by the data acquiring means with a reference value for determining whether to carry out the transmitted power control based on the transmitted power control signal or not,
  wherein the transmitted power control means does not carry out the transmitted power control based on the transmitted power control signal received with the wireless link or path with which the data are acquired in the case where a value indicated by the information is less than the reference value,
  wherein the comparing means uses a difference in communication quality indicated by the data acquired from the two wireless links or two paths as the information on the data acquired by data acquiring means, and
  wherein the transmitted power control means does not carry out the transmitted power control based on the transmitted power control signal received with the wireless link or path with which the data indicating lower communication quality have been acquired in the case where the difference is less than the reference value.

8. The mobile terminal device as claimed in claim 7, wherein the data acquiring means measures a DPCH_RSCP of every wireless link to be set to the data indicating the communication quality.

9. The mobile terminal device as claimed in claim 7, wherein the data acquiring means measures a DPCH_SIR of every wireless link to be set to the data indicating the communication quality.

10. The mobile terminal device as claimed in claim 7, wherein the data acquiring means measures a DPCH_RSCP of every path to be set to the data indicating the communication quality.

11. The mobile terminal device as claimed in claim 7, wherein the data acquiring means measures a DPCH_SIR of every path to be set to the data indicating the communication quality.

12. The mobile terminal device as claimed in claim 7, wherein the data acquiring means detects pilot synchronization of every path, and sets a pilot synchronization count number for every frame to data indicating communication quality as the data indicating the communication quality.

13. A wireless communication system comprising a base station and a mobile terminal device carrying out communication with a wireless link of a CDMA system,
wherein the base station transmits a transmitted power control signal indicating increase or decrease of transmitted power,
wherein the mobile terminal device comprises:
transmitted power control means for carrying out transmitted power control in accordance with the received transmitted power control signal;
data acquiring means for acquiring data for every wireless link or every path, the data indicating communication quality of a signal from a device of a communication companion; and
comparing means for comparing information on the data acquired by the data acquiring means with a reference value for determining whether to carry out the transmitted power control based on the transmitted power control signal or not, and
wherein the transmitted power control means does not carry out the transmitted power control based on the transmitted power control signal received with the wireless link or path with which the data are acquired in the case where a value indicated by the information is less than the reference value,
wherein the comparing means uses a difference in communication quality indicated by the data acquired from the two wireless links or two paths as the information on the data acquired by data acquiring means, and
wherein the transmitted power control means does not carry out the transmitted power control based on the transmitted power control signal received with the wireless link or path with which the data indicating lower communication quality have been acquired in the case where the difference is less than the reference value.

14. A non-transitory computer readable medium storing a computer program executed in a control device of a mobile terminal device, the control device carrying out communication with a wireless link in a wireless communication system of a CDMA system, the control device controlling transmitted power in accordance with a transmitted power control signal, the transmitted power control signal indicating increase or decrease of the transmitted power received from a base station, the computer program causing the control device to execute:
a procedure to compare information on data indicating communication quality of a signal from the base station for every wireless link or every path with a reference value for determining whether to carry out transmitted power control based on the transmitted power control signal or not; and
a procedure to determine whether to carry out the transmitted power control based on the transmitted power control signal received with the wireless link or path with which the data are acquired or not in accordance with a comparison result,
wherein, in the procedure to compare, a difference in communication quality indicated by the data acquired from two wireless links or two paths is used as the information on data indicating communication quality, and
wherein, in the procedure to determine, in the case where the difference is less than the reference value, the transmitted power control is not carried out.

* * * * *